United States Patent
Vanstone et al.

(10) Patent No.: US 6,446,207 B1
(45) Date of Patent: *Sep. 3, 2002

(54) VERIFICATION PROTOCOL

(75) Inventors: Scott A. Vanstone, Waterloo (CA); Donald B. Johnson, Manassas, VA (US)

(73) Assignee: Certicom Corporation, Ontario (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/015,338

(22) Filed: Jan. 29, 1998

Related U.S. Application Data (63) Continuation-in-part of application No. 08/962,441, filed on Oct. 31, 1997, now abandoned.

(30) Foreign Application Priority Data

Jan. 31, 1997 (GB) .............................................. 9702063

(51) Int. Cl.[7] .............................................. H04L 9/30
(52) U.S. Cl. ......................................... 713/180; 380/30
(58) Field of Search ............................. 380/30; 713/180

(56) References Cited

U.S. PATENT DOCUMENTS 4,995,081 A * 2/1991 Leighton et al. .............. 380/23
5,475,763 A   12/1995 Kaufman et al. .............. 380/30

FOREIGN PATENT DOCUMENTS

WO    WO 97/02679    1/1997    ............. H04L/9/32

OTHER PUBLICATIONS

Menezes et al. Handbook of Applied Cryptography, CRC Press, Oct. 17, 1996, pp. 452–460.*

Schneier, Applied Cryptography, Oct. 1995, John Wiley and Sons, Inc., pp. 34–44, 464, 480.*

Schnorr CP: "Efficient Identification and Signatures for Smart Cards" Lecture Notes in Computer Science, US, Springer Verlag, New Yor, NY, Aug. 20, 1999, pp. 239–252, XP002052048 ISSN:0302–9743 *p. 239, line 7–line 25* p. 242, line 10—p. 243, line 22 *figure 2*.

* cited by examiner

*Primary Examiner*—Gail Hayes
*Assistant Examiner*—Bryan Lathan
(74) *Attorney, Agent, or Firm*—Finnegan, Henderson, Farabow, Garrett, & Dunner, L.L.P.

(57) ABSTRACT

A digital signature verification protocol utilises a pair of signature components incorporating a pair of private keys, one of which is a long term key and the other of which is a short term key.

The long term key is applied to one of the signature components to reveal the short term key.

The short term key is then used to compute a value of a signature component contained in the signature. If the computed value and received values agree then authenticity is verified.

30 Claims, 5 Drawing Sheets

VERIFICATION PROTOCOL

This application is a Continuation-In-Part of U.S. patent application Ser. No. 08/962,441 filed Oct. 31, 1997 now abandoned, in the names of Donald B. JOHNSON and Scott A. VANSTONE, the content of which is incorporated herein by reference.

The present invention relates to data transmission and more particularly to data transmission systems to verify the identity of the parties transmitting data.

It is well known to communicate data electronically between a pair of correspondents, typically a pair of computer terminals or a personal card and a computer terminal. Widespread use is made of such communication in the banking environment in order to conduct transactions.

To maintain the integrity of such transactions, it is necessary to implement a system in which the identity of the parties can be verified and for this purpose a number of signature protocols have been developed. Such protocols are based upon El Gamal signature protocols using the Diffie Hellman public key encryption scheme. One commonly used cryptographic scheme is that known as RSA but to obtain a secure transmission, a relatively large modulus must be used which increases the band width and is generally undesirable where limited computing power is available. A more robust cryptographic scheme is that known as the elliptic curve cryptosystem (ECC) which may obtain comparable security to the RSA cryptosystems but with reduced modulus.

Basically, each party has a private key and a public key derived from the private key. Normally for data transfer, a message is encrypted with the public key of the intended recipient and can then be decrypted by that recipient using the private key that is known only to the recipient. For signature and verification purposes, the message is signed with the private key of the sender so that it can be verified by processing with the public key of the stated sender. Since the private key of the sender should only be known to the sender, successful decryption with the sender's public key confirms the identity of the sender.

The El Gamal signature protocol gets its security from the difficulty in calculating discrete logarithms in a finite field. El Gamal-type signatures work in any group including elliptic curve groups. For example given the elliptic curve group $E(F_q)$ then for $P \in E(F_q)$ and $Q=aP$ the discrete logarithm problem reduces to finding the integer a. With an appropriately selected underlying curve, this problem is computationally infeasible and thus these cryptosystems are considered secure.

Various protocols exist for implementing such a scheme. For example, a digital signature algorithm DSA is a variant of the El Gamal scheme. In this scheme a pair of correspondent entities A and B each create a public key and a corresponding private key. The entity A signs a message m of arbitrary length with his private key. The entity B can verify this signature by using A's public key. In each case however, both the sender, entity A, and the recipient, entity B, are required to perform a computationally intensive operations, typically an exponentiation, to generate and verify the signature respectively. Where either party has adequate computing power this does not present a particular problem but where one or both the parties have limited computing power, such as in a "Smart card" application, the computations may introduce delays in the signature and verification process.

There are also circumstances where the signor is required to verify its own signature. For example in a public key cryptographic system, the distribution of keys is easier than that of a synmnetric key system. However, the integrity of public keys is critical. Thus the entities in such a system may use a trusted third party to certify the public key of each entity. This third party may be a certifying authority (CA), that has a private signing algorithm $S_T$ and a verification algorithm $V_T$ assumed to be known by all entities. In its simplest form the CA provides a certificate binding the identity of an entity to its public key. This may consist of signing a message consisting of an identifier and the entity's authenticated public key. From time to time however the CA may wish to authenticate or verify its own certificates.

As noted above, signature verification may be computationally intensive and to be completed in a practical time requires significant computing power. Where one of the correspondents has limited computing capacity, such as the case where a "smart card" is utilized as a cash card, it is preferable to adopt a protocol in which the on card computations are minimized. Likewise, where a large number of signatures are to be verified, a rapid verification facility is desirable.

It is therefore an object of the present invention to provide a signature and verification protocol that facilitates the use of limited computing power for one of the correspondents and verification of the signature.

In general terms, the present invention provides a method of generating and verifying a signature between a pair of correspondents each of which shares a common secret integer comprising the steps of generating from a selected integer a session key at one of the correspondents, selecting a component of said session key and encrypting a message with said selected component, generating a hash of said selected component, and computing a signature component including said common secret integer, said hash and said selected integer and forwarding the signature component, encrypted message and has to the other correspondent. The selected integer may be recovered for the signature component using the common secret integer and the session key encrypted. The balance of the recovered session key may then be used to provide authorized and,. optionally, a challenge to the recipient.

An embodiment of the invention will now be described by way of example only, with reference to the accompanying drawings, in which.

Figure 1:
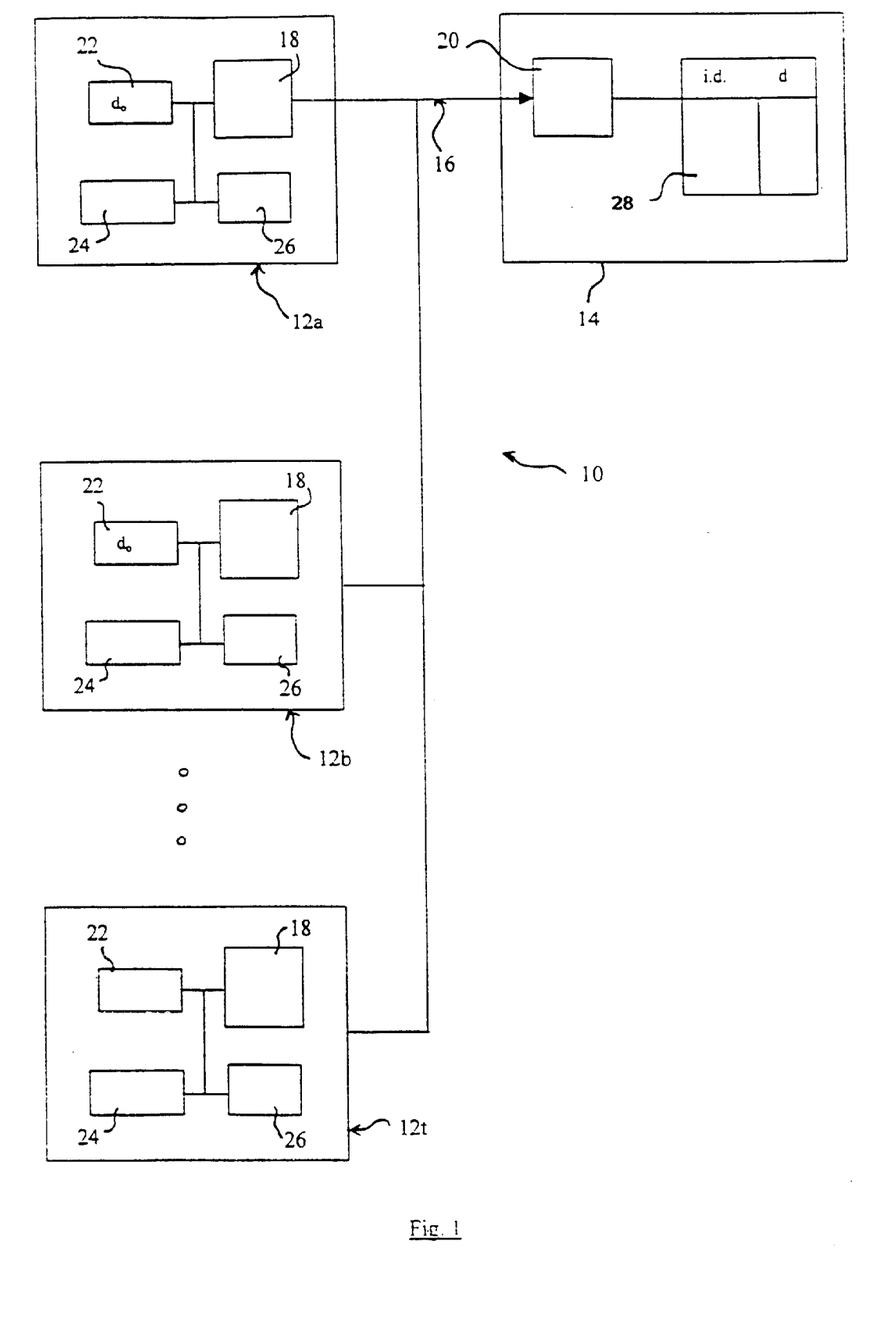
FIG. 1 is a schematic representation of a data transmission system.

Referring therefore to FIG. 1, a data transmission system 10 includes a plurality of correspondents 12a, 12b, ... 12t, ( generically referred to by reference numeral 12) interconnected by a data transmission link 16. The correspondents 12 are typically electronic terminals having a limited computing capacity, and in the present example, the correspondent 12 may be considered to be in the form of a "smart card" having limited memory and computing capacity. The data transmission system 10 also includes a correspondent 14 that in this embodiment may be a terminal in a banking institution, connected by the transmission link 16 to respective ones of the terminals 12. Such connection will typically be on a transient basis as correspondents 12 periodically access the system 10 but may be permanent connections.

The correspondents 12,14 each have encryption units indicated at 18,20 that establish a common cryptosystem. In the example provided, it will be assumed that the encryption units 18,20 implement an elliptic curve cryptosystem with established underlying curve parameters and seed point P on that curve.

Each of the correspondents 12 also includes a memory 22 in which is embedded a respective secret integer d used as a long term private key by the correspondent 12 for multiple transactions. The correspondent 14 has a public key $Q_B$ and a number of precomputed values of $dQ_B$ is stored in an addressable memory 24 on the correspondent 12 to facilitate signature.

A number generator 26 is included on each card to generate a statistically unique but unpredictable integer at the start of each session for use as a short term private key that will change at each transaction.

The correspondent 14 similarly includes a memory 28 having a databank which stores the respective long term private key d of each of the correspondents 12 and correlates it to the identity of the respective one of the correspondents 12.

Figure 2:
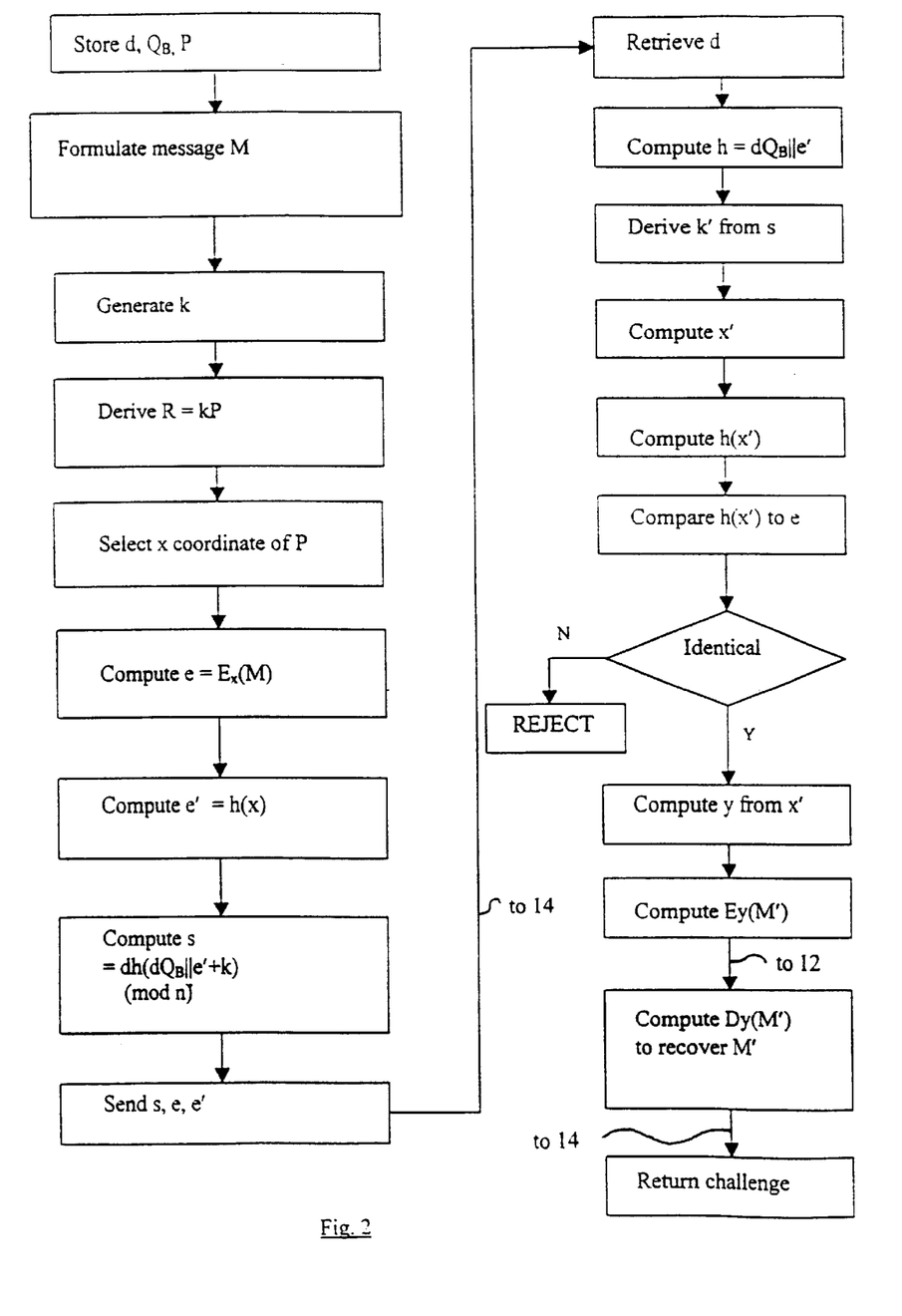
FIG. 2 is a schematic flow chart of a signature verification protocol.

To initiate a verification protocol, one of the correspondents 12 formulates a message m and generates a random integer k from the generator 26 which acts as a short term private key during the transmission session. Using the seed point P, it computes a session key r which corresponds to kP. kP is in fact a point on the underlying curve with coordinates (x,y).

A first signature component e is generated by encrypting a message m using the binary representation of the x coordinate so that $e=E_x(m)$.

A second signature component e' is generated by hashing the x coordinate of the session key r such that $e'=h(x)$. A suitable cryptographic hash function is used such as the secure Hash Algorithm (SHA-1) proposed by the U.S. National Institute for Standards and Technology (NIST).

A third signature component s is generated of the general form $s=aH+k$ (mod n) where a is the long term private key, H is a value derived by hashing a message string and k is the short term private key. In this embodiment the signature component s has the specific form $$s=d.h(dQ_B//e')+k$$

where n is the order of the underlying curve. The signature conent s is obtained by retrieving the precomputed value of $dQ_B$ from memory of 24 of correspondent 12 and concatenating it with the hash value of x and then hashing the result A signature including signature components s, e and e' is then forwarded to the correspondent 14. Upon receipt the correspondent 14 retrieves the long term private key d from the databank 28 based on the indicated identity of the correspondent 12 and together with its own public key, $Q_B$ and the received component e' computes the hash $h=dQ_B//e'$. From that and the signature component s, a value k' can be obtained which should correspond to k.

Utilizing the computed value of k and the seed point P, a function associated with the computed value of the short term key, namely the value of the x coordinate of kP, x', can be obtained. The computed value of x' is then hashed and a comparison made to verify that the resultant value of the hash corresponds with the received value of e'. At that stage, verification of the correspondents has been obtained and the only exponentiation required is the initial computation of kP.

The computation of the session key r and the subsequent use of a portion of that session key enables a secure authorization to be returned by the correspondent 14. Having computed the value of the coordinate x, the correspondent 14 can then compute the coordinate y and use it to encrypt a message m as authorization. Thus the correspondent 14 responds to the correspondent 12 by forwarding a message including Ey(m'). Upon receipt, the correspondent 12 knows the y coordinate of the session key R and can recover the message m' that conveniently includes a challenge. The correspondent 12 decrypts the message and returns the challenge to the correspondent 14 so that the correspondents are then verified and synchronized. Further messages may then be transferred between the correspondents 12,14 using the session key r as the encryption key.

It will be seen, therefore, that in the above protocol, a pair of keys are utilised and the correspondent 14 retains control of one of the keys that provides a long term private key and utilizes these to recover the short term session key computed by the correspondent 12. The recovered short term key can then be used for verification with other transmitted signature components, e.g. by checking e'.

Alternatively, the structure of the recovered value of the key could be indicative of verification, for example, by the pattern, number or distribution of digits so that the recovered value may be compared with predetermined parameters for verification. By virtue of the relationship between the recovered component and the information forwarded, the other portion of the session key can be utilized to reply and establish synchronization.

In this embodiment, it will be noted that the signature verification is performed in a computationally expedient manner without exponentiation and so may be performed relatively quickly.

It will also be noted that the system 10 may function as a public key encryption system between the correspondents 12 or correspondents 12, 14 but where rapid verification is required, it may use the attributes of a symmetric key protocol.

Figure 3:
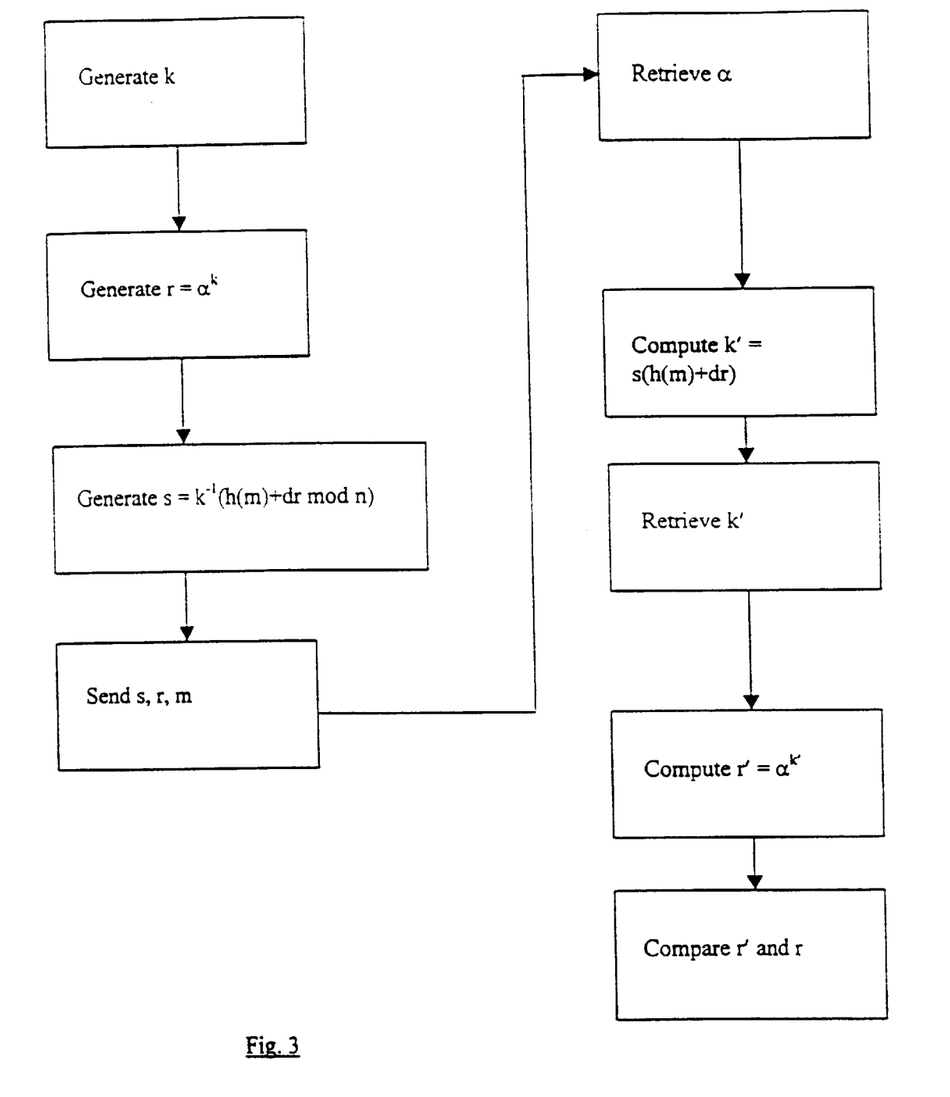
FIG. 3 is a schematic flow chart of an alternative protocol.

As will be exemplified below, alternative signatures may be used and generally any El Gamal signing equation may be used. An alternative embodiment of signature verification may be implemented using the DSS signature protocol, as shown in FIG. 3. In this protocol, a short term public key r is derived by exponienting the group generator α with a random integer k, i.e. $r=α^k$. (If an elliptic curve cryptosystem is utilised, then the exponentiation is performed by a k fold addition of the point P so that r=kP).

With the DSS protocol, the signature component s is of the form $$s=k^{-1}(h(m)+dr) \pmod{n}$$

where d is a long term private key and m is the message. The values of signature components s, r and the message m is forwarded by the correspondent 12 to the correspondent 14.

Correspondent 14 shares the long term private key d and so can retrieve the short term private key k from the identity k=s (h(m)+dr).

As the values of r, m and s are sent and, d is known by the correspondent 14, k can be computed.

As noted above, k can be arranged to have a specific structure, such as a specific pattern or a certain number of 1's and this may be used as verification. Alternatively, the verification may be checked by computing a value of r from the recovered k (i.e. $r=α^k$) and comparing it with the transmitted r. This step requires an exponentiation and therefore is computationally more demanding but may be utilised where desirable.

Again, by sharing the long term private key d, a verification can be performed in a simple yet effective manner by extracting the short term private key, k.

In each of the above examples, the signature verification is performed between a pair of correspondents. The characteristics of the protocol may be utilised to verify a signature issued by a certifying authority CA, such as a bank, constituted by correspondent 14.

In this embodiment, the correspondent 14 receives a certificate purporting to have been issued by it. The correspondent 14 verifies the authenticity of the certificate using the long term private key d to extract the short term private key k. The structure of the private key k can then be checked or the key k used to derive information relating to the short term public key, r, included in the message. Again, verification can be obtained without extensive computation in an expedient manner and allows the verification of certificates received by the correspondent 14, i.e. a bank or financial institution.

This embodiment may be exemplified using the digital signature algorithm,DSA, which is a special case of the El Gamal signature scheme. For key generation in the El Gamal signature scheme, each correspondent A and B creates a public key and corresponding private key. In order to set up the underlying cryptosystem in a group $F_p$, the entities A and B select primes p and q such that q divides p−1. A generator g is selected such that it is an element of order q in $F_p$ and the group used is $\{g^0, g^1, g^2, \ldots g^{q-1}\}$.

In the digital signature algorithm (DSA) key generation is performed by selecting a random integer d in the interval [1, q−1] and computing a long term public key $y=g^d$ mod p. The public key information is (p, q, g, y) and the long term private key is d, while in the general El Gamal scheme the public key information is (p, g, y) and the private key is d.

In a DSA signature scheme the signature components r and s are given by:

$r=(g^k$ mod p)mod q; and $s=k^{-1}(h(m)+dr)$mod q where typically:

d is a random integer, the signors long term private key and is typically 160-bits;

p is typically a 1024-bit prime;

q is a 160-bit prime where q divides p−1;

g is the generator such that $y=g^d$ mod p;

h(m) is typically a SHA-1 hash of the message m;

k is a randomly chosen 160-bit value for each signature; and the signature for m is the pair (r, s).

Normally to verify A's signature (r, s) on the message m, the recipient B should obtain A's authentic public key information (p, q, g, y), and verify that 0<r<q and 0<s<q. Next the values $w=s^{-1}$ mod q and h(m) are computed. This is followed by computing $u_1=w\,h(m)$ mod q and $u_2=r\,w$ mod q and $v=(g^{u_1}y^{u_2}$ mod p) mod q. The signature is accepted if and only if v=r. It may be seen therefore that in some cases if the owner of the signature wants to verify its own signature at a later stage it may be time consuming to retrieve the public key information and perform the steps above, which include a pair of exponentiations.

Figure 4:
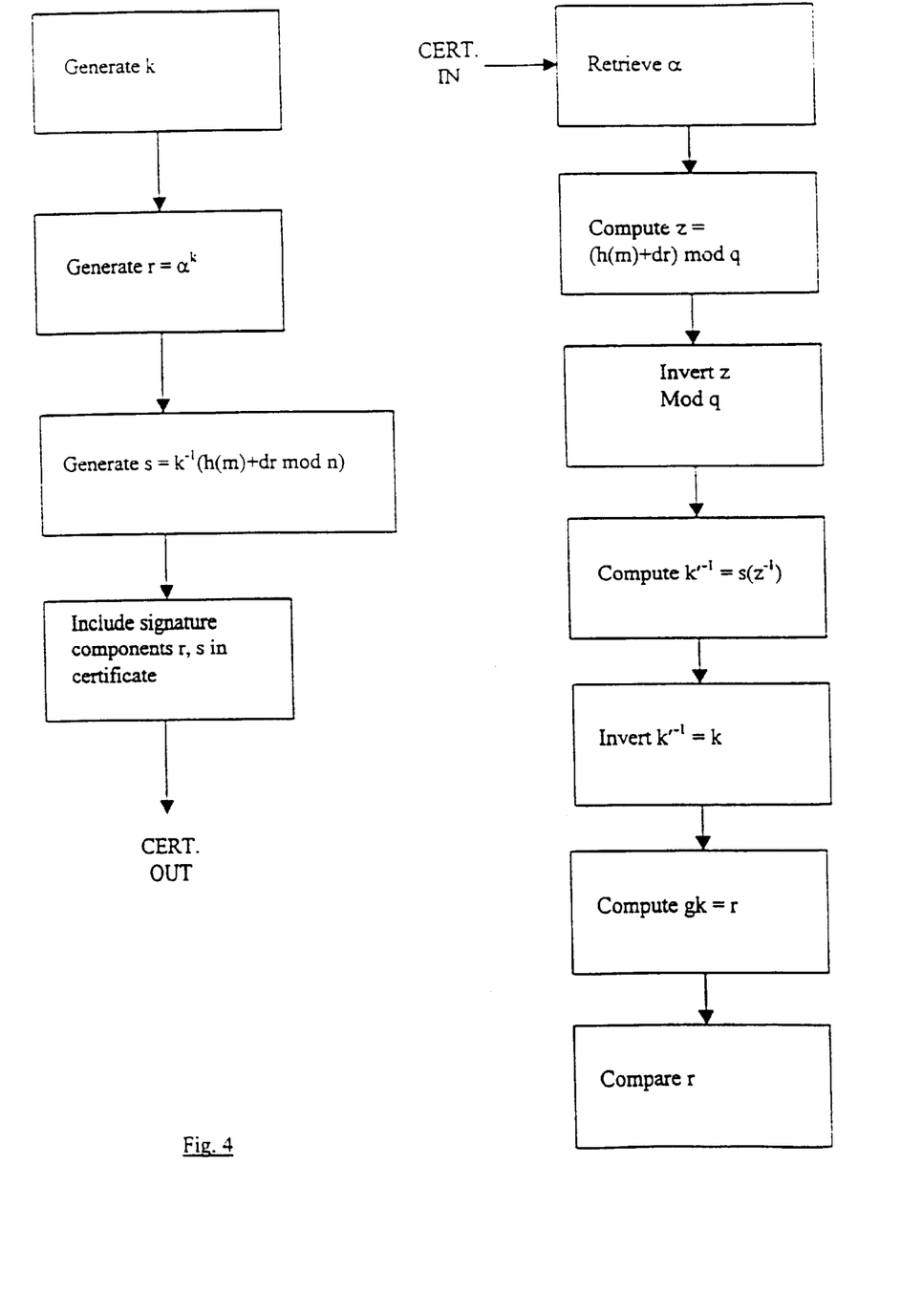
FIG. 4 is a schematic flow chart of a further protocol

A fast signature verification by the certifying authority CA may be implemented as shown in FIG. 4 using the long term private key d of the certifying authority as the verifier. In this case the original signor has knowledge of p, q, g, y, h(m), r and s. Thus the verifier need only recover the short term private key k used in the signature and verify the value of k thus obtained in order to verify the signature. The verifier thus calculates z=(h(m)+dr)mod q. The value $z^{-1}$ is calculated by inverting z mod q and used to compute $k'^{-1}=s(z^{-1})$mod q.k' may be calculated by inverting $k'^{-1}$ mod q. The verifier then evaluates $r=g^{k'}$ mod p mod q and verifies that k=k'. Thus it may be seen that this verification step uses the long term private key d rather than the long term public key y to avoid exponentiation. Naturally many of the calculations above can be sped up using pre-computed tables.

Figure 5:
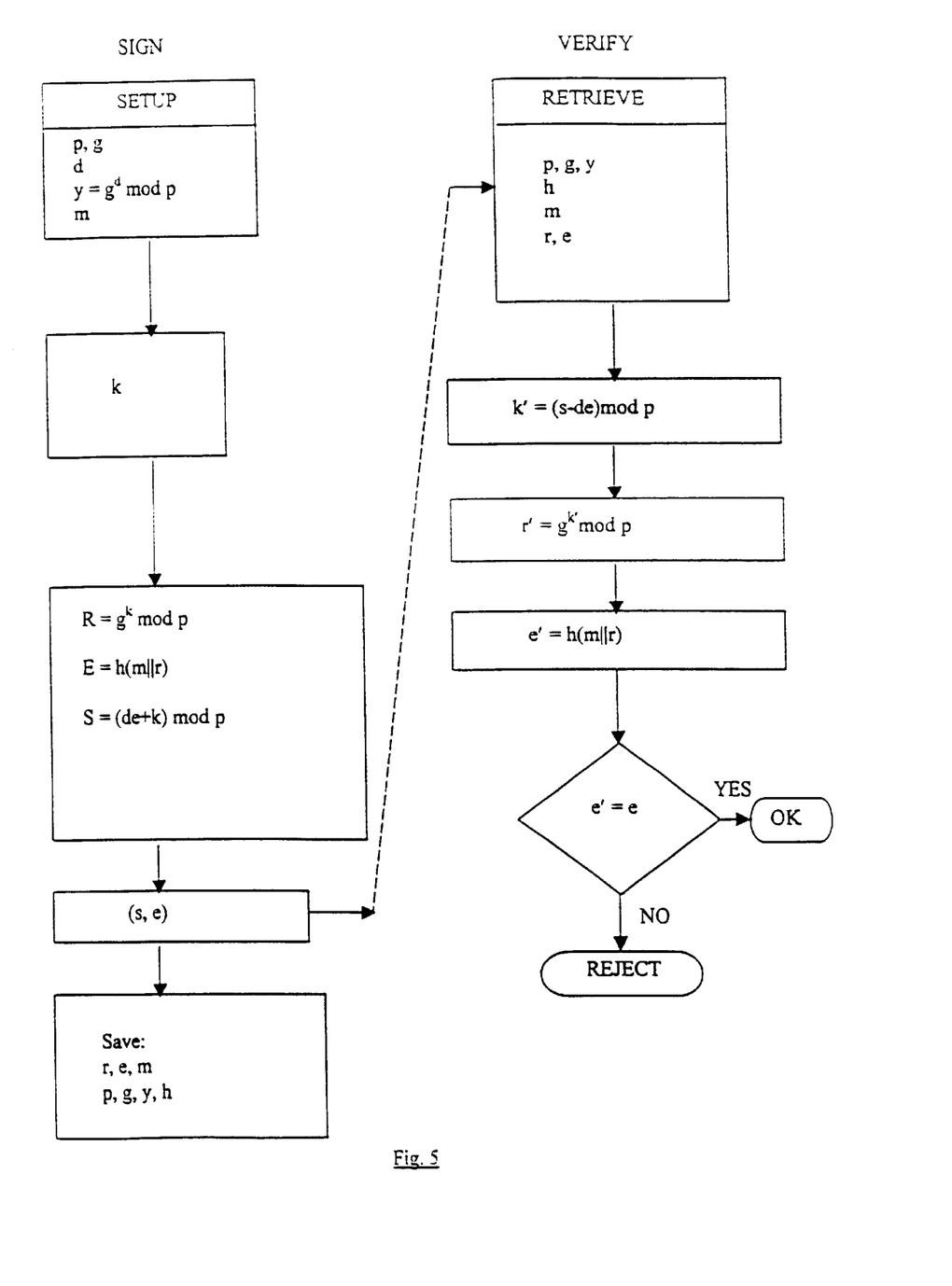
FIG. 5 is a schematic flow chart showing an alternate El Gamal signature method.

An alternate El Gamal signature method is shown in FIG. 5 and has signature components (s, e) where:

$r=g^k$ mod p;

e=h(m||r) where || indicates concatenation; and s=(de+k)mod p where p is a large public prime, g is a public generator, m is a message, h is a hash function, d is a long term private key, $y=g^d$ mod p is the corresponding long term public key and k is a secret random integer used as a short term private key.

To generate a certificate, the correspondent 14 signs a message m containing the identity of one of the correspondents 12 and that correspondents public key. The message is signed using the long term public key and a short term session key k of the correspondent 14 and a certificate issued to the correspondent 12 including the signature components s,e. The public information is retained by the correspondent 14. The certificate may be used by the correspondent 12 and verified by recipients using the public key of correspondent 14.

When a certificate is presented to the correspondent 14, a rapid verification may be obtained using the long term private key d.

In fast signature verification using the private key d the public information of p, g, y, h, m, r, e and private key d is known by the verifier. Thus the verifier need only recover the short term private key k and verify k in order to verify the signature. The verifier calculates k'=(s−de)mod p, $r'=g^{k'}$ mod p and e'=h(m||r'). If e=e' this verifies k=k'. Only one exponentiation is required in this verification to facilitate the process. Alternatively the characteristics of the recovered value of k may be sufficient to satisfy verification as discussed above.

Thus it may be seen that a particular advantage of the present invention is where a signor signs data which for example may reside on the signors computer. This can be later verified without use of the correponding public key, instead the signor can use its private key to verify the data. This is also very useful for some applications with limited computational power such as smartcards.

In a data communication system that includes a certifying authority, the certifying authority (CA) or key distribution centre would sign data frequently before it is installed into the various communications systems and then could verify the signatures later. Thus the CA does not require the public key information to verify the signatures but simply uses the long term private key to verify, as all the other parameters are stored within the secure boundary of the signor. It will also be noted that as the long term private key d is used it is not necessary to retain the short term private key k so that the overhead associated with the system is minimised.

A further application is in the verification of software such in pay-per-use software applications. A request for access to a server may be controlled by a certificate issued by the server and presented by the user of the software. The authenticity of the certificate may then be verified using the servers private key as described above in an expeditious manner.

While the invention has been described in connection with specific embodiments thereof and in specific uses, various modifications thereof will occur to those skilled in the art without departing from the spirit of the invention as set forth in the appended claims. For example, in the above description of preferred embodiments, use is made of multiplicative notation however the method of the subject invention may be equally well described utilizing additive notation. It is well known for example that the elliptic curve algorithm equivalent of the DSA, i.e. ECDSA is the elliptic curve analog of a discrete logorithm algorithm that is usually described in a setting of $F^*_p$, the multiplicative group of the integers modulo a prime. There is correspondence between the elements and operations of the group $F^*_p$ and the elliptic curve group $E(F_q)$. Furthermore, this signature technique is equally well applicable to functions performed in a field defined over $F_{2^n}$.

The present invention is thus generally concerned with an encryption method and system and particularly an elliptic curve cryptograhic method and system in which finite field elements is multiplied in a processor efficient manner. The cryptographic system can comprise any suitable processor unit such as a suitably programmed general-purpose computer.

The embodiments of the invention in which an exclusive property or privilege is claimed are defined as follows:

1. A method of verifying at a recipient a digital signature generated by a signor in a data communication system, said signature having a pair of signature components, one of said components incorporating first and second private keys with said first private key known to said recipient and signor and the other of said components having a value equivalent to a function associated with said second private key, said method of verifying comprising the steps of applying at said recipient said first of said private keys to said signature components to recover a value equivalent to said function associated with said second of said private keys and comparing said recovered value wit said other signature component to determine the authenticity of said signature.

2. A method according to claim 1 wherein said recovered value is used to compute a value of one of said signature components and said computed value and said signature component are compared to verify said signature.

3. A method according to claim 1 wherein the structure of said recovered value is compared with predetermined parameters to verify said signature.

4. A method according to claim 1 wherein one of said keys is a long term key and the other of said keys is a short term key generated for each signature.

5. A method according to claim 4 wherein said recovered value corresponds to said short term key.

6. A method according to claim 5 wherein said recovered value is used to compute a short term public key derived from said private key and included in said signature components.

7. A method according to claim 5 wherein at least a portion of said recovered value is hashed by a cryptographic hash function and a resultant hash value is compared to one of said signature components for verification.

8. A method of verifying a digital signature generated by a signor in a computer system, said signor having a private key d and a public key y, derived from an element g and said private key d said signature being generated by signing a message m in said computer system by:
   a) generating a first signature component by combining at least said element g and a value k used by said signor as a short signature parameter according to a first mathematical function; and
   b) generating a second signature component by mathematically combing said first signature component with said private key d; said message m and said signature parameter k; said method of verifying said digital signature comprising the steps of:
   c) recovering a value k' from said signature without using said public key y, and;
   d) utilizing said recovered value k' in said first mathematical function to derive a value r' to verify said signature parameter k and k ' are equivalent.

9. A method as defined in claim 8, wherein g is an element of order q in a field $F^*_p$.

10. A method as defined in claim 8, wherein g is a point of prime order n in $E(F_q)$, such that E is an elliptic curve defined over the field $F_q$.

11. A method as defined in claim 8, wherein said element g is a point on an elliptic curve over a finite field $F_{q^n}$.

12. A method as defined in claim 8, said signature parameter k being a randomly selected integer in the interval [1, q−1], and said first signature component having a form defined by by $r=g^k$ mod p mod q, wherein p and q are primes such that q divides p−1.

13. A method as defined in claim 12, including calculating a value e=h(m) wherein h is a hash function, and wherein said second signature component $s=k^{-1}(e+dr)$ mod q.

14. A method as defined in claim 13, said step of recovering said value k' including:
   (a) calculating a value z=(h(m)+dr)mod q;
   (b) calculating $z^{-1}$ inverting z mod q;
   (c) calculating $k'^{-1}=s(z^{-1})$ mod q; and
   (d) calculating k' by inverting $k^{-1}$ mod q.

15. A method as defined in claim 14, said step of verifying that said signature parameter k and said value k' are equivalent including tie steps of calculating $r'=g^k$ mod p mod q and comparing r' ro r in order to verify k=k'.

16. A method as defined in claim 14 including utilizing precomputed tables in said calculations.

17. A method as defined in claim 10, said signature parameter k being a statistically unique and unpredictable integer k selected in an interval {2, n−2} and said fist signature component having a form defined by r=x, mod n wherein x is a co-ordinate of a private key.

18. A method as defined in claim 17, including calculating a value e=h(m) wherein h is a hash function and said second signature component is given by $s=k^{-1}(e+dr)$ mod n.

19. A method as defined in claim 18, wherein said step of recovering said value k' includes:
   a) calculating a value z=(h(m)+dr) mod n;
   b) calculating $z^{-1}$ by inverting z mod n;
   c) calculating $k'^{-1}=s(z^{-1})$ mod n, and
   d) calculating k' by invert $k^{-1}$ mod n.

20. A method as defined in claim 19, wherein said step of verifying that said signature parameter k and said k' are equivalent including the steps of calculating $r'=g^{k'}$ mod n and comparing r' to r in order to verify k=k'.

21. A method as defined in claim 19, wherein said signature parameter k is a randomly selected integer in an interval, and said first signature component has a form defined by e=h(m r'); wherein $r=g^k$ mod p, h is a hash function and denotes concatenation.

22. A method as defined in claim 21, wherein said second signature component is defined by s=(de+k) mod p.

23. A method as defined in claim 22, wherein said step of recovering said value k' includes:
   a) calculating a value k'=(s−de) mod p;
   b) calculating a value $r'=g^k$ mod p;
   c) calculating a value e'=h(m r'); and
   d) comparing said value e' to e in order to verify k'=k.

24. A method of verifying the authenticity of a certificate issued by a certifying authority in an electronic data communication system, said method including the steps of said certifying authority including in said certificate a pair of signature components derived from a pair of private keys, said certifying authority retaining one of said private keys, said certifying authority receiving said certificate and applying said private key to said signature components to derive therefrom a value corresponding to a function of the other of said private keys and comparing said derived value with said function to determine the authenticity of said certificate.

25. A method according to claim 24 wherein said derived value is compared with predetermined parameters to determine the authenticity of said certificate.

26. A method according to claim 24 wherein said derived value corresponds to said other key.

27. A method according to claim 26 wherein said one key is a long term private key used in a plurality of signatures and said other key is a short term key derived for each signature.

28. A method according to claim 26 wherein said signature components include a public key derived from said other key and said method includes the step of deriving a corresponding public key from said derived value and comparing said public key in said signature components with said corresponding public key.

29. A data communication system having a pair of correspondents connected by a data communication link, each of said correspondents having a cryptographic function to implement a public key cryptographic scheme utilising a pair of private keys, one of said private keys being utilised for multiple communications between said correspondents and the other of said private keys being generated by one of said correspondents at each communication, said one private key being shared by said correspondents to permit the other of said private keys to be recovered by said other correspondent from a digital signature generated by said one correspondent and compared to a signature component of said digital to verify the authenticity of said one correspondent.

30. A data communication system according to claim 29 wherein said cryptographic functions implement an elliptic curve cryptosystem.

* * * * *

UNITED STATES PATENT AND TRADEMARK OFFICE
CERTIFICATE OF CORRECTION

PATENT NO. : 6,446,207 B1  Page 1 of 1
DATED : September 3, 2003
INVENTOR(S) : Scott A. Vanstone et al.

It is certified that error appears in the above-identified patent and that said Letters Patent is hereby corrected as shown below:

Column 7,
Line 32, "wit" should read -- with --.
Line 54, "verifying a" should read -- verifying at a recipient a --.
Line 64, "combing" should read -- combining --.
Line 65, "key d;" should read -- key d, --.

Column 8,
Line 5, "k '" should read -- k' --.
Line 30, "tie" should read -- the --.
Line 31, "ro" should read -- to --.
Line 47, "invert" should read -- inverting --.
Line 55, "e=h(m r');" should read -- e=h(m2r'); --.
Line 56, "and denotes" should read -- and 2 denotes --.
Line 64, "e'=h(m r');" should read -- e'=h(m2r'); --.

Signed and Sealed this

Seventh Day of October, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,446,207 B1
DATED         : September 23, 2003
INVENTOR(S)   : Scott A. Vanstone and Donald B. Johnson It is certified that error appears in the above-identified patent and that said Letters Patent is hereby corrected as shown below:

<u>Column 8,</u>
Line 55, "e=h(m r');" should read -- e=h(m||r'); --.
Line 56, "and denotes" should read -- and || denotes --
Line 64, "e'=h(m r');" should read -- e'=h(m||r'); --

Signed and Sealed this

Seventeenth Day of February, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,446,207 B1 Page 1 of 1
APPLICATION NO. : 09/015338
DATED : September 3, 2002
INVENTOR(S) : Scott A. Vanstone et al.

It is certified that error appears in the above-identified patent and that said Letters Patent is hereby corrected as shown below:

Column 2, line 36, delete "has" and replace with "hash"

Column 3, lines 27, 34, and 65, delete "session key r" and replace with "session key R"

Column 4, line 40, delete "exponienting" and replace with "exponentiation of"

Column 5, line 66, insert a space between q. and k'

Column 8, line 16, delete the second "by"

Column 8, line 36, delete "fist" and replace with "first"

Column 10, line 16, insert --signature-- following "digital"

In claim 21, column 8, line 55, "e=h(m r');" should read --e=h(m||r');--

In claim 21, column 8, line 56, "and denotes" should read --and || denotes--

In claim 23, column 8, line 64, "e'=h(m r');" should read --e'=h(m||r');--

Signed and Sealed this

Thirteenth Day of April, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 6,446,207 B1 | Page 1 of 1 |
| APPLICATION NO. | : 09/015338 | |
| DATED | : September 3, 2002 | |
| INVENTOR(S) | : Scott A. Vanstone and Donald B. Johnson | |

It is certified that error appears in the above-identified patent and that said Letters Patent is hereby corrected as shown below:

Title Page, item (73), "Assignee: Certicom Corporation, Ontario (CA)" should read as --Assignee: Certicom Corp., Mississauga (CA)--

Signed and Sealed this

Twentieth Day of August, 2013

Teresa Stanek Rea
*Acting Director of the United States Patent and Trademark Office*